(12) United States Patent
Huang et al.

(10) Patent No.: US 10,183,863 B2
(45) Date of Patent: Jan. 22, 2019

(54) POROUS HOLLOW SHELL $WO_3/WS_2$ NANOMATERIAL AND METHOD OF PREPARING SAME

(71) Applicant: Shaanxi University of Science & Technology, Shaanxi (CN)

(72) Inventors: Jianfeng Huang, Shaanxi (CN); Xin Wang, Shaanxi (CN); Liyun Cao, Shaanxi (CN); Jiayin Li, Shaanxi (CN); Haibo Ouyang, Shaanxi (CN); Cuiyan Li, Shaanxi (CN); Wei Hao, Shaanxi (CN); Zhanwei Xu, Shaanxi (CN); Jie Fei, Shaanxi (CN); Chunyan Yao, Shaanxi (CN)

(73) Assignee: Shaanxi University of Science & Technology, Shaanxi (CN)

( * ) Notice: Subject to any disclaimer, the term of this patent is extended or adjusted under 35 U.S.C. 154(b) by 109 days.

(21) Appl. No.: 15/531,708

(22) PCT Filed: Jun. 4, 2015

(86) PCT No.: PCT/CN2015/080765
§ 371 (c)(1),
(2) Date: May 30, 2017

(87) PCT Pub. No.: WO2016/179865
PCT Pub. Date: Nov. 17, 2016

(65) Prior Publication Data
US 2017/0341935 A1    Nov. 30, 2017

(30) Foreign Application Priority Data
May 13, 2015    (CN) .......................... 2015 1 0243715

(51) Int. Cl.
*H01M 4/00*    (2006.01)
*B82Y 30/00*    (2011.01)
(Continued)

(52) U.S. Cl.
CPC ............... *B82Y 30/00* (2013.01); *B01J 13/02* (2013.01); *C01G 41/00* (2013.01); *C01G 41/02* (2013.01);
(Continued)

(58) Field of Classification Search
CPC ......... B22F 9/24; H01M 4/458; H01M 4/364; H01M 4/483; H01M 4/5815;
(Continued)

(56) References Cited

U.S. PATENT DOCUMENTS

2010/0210450 A1    8/2010    Yadav
2013/0130090 A1*   5/2013    Takamori .............. H01M 4/505
                                                                429/144

FOREIGN PATENT DOCUMENTS

CN    101723464 A    6/2010
CN    101767826 A    7/2010
(Continued)

OTHER PUBLICATIONS

Zhu, Y. et al., "Preparation Technology and Applications of Nanoscaled WS2 and MoS2," Guangzhou Chemical Industry, vol. 40, No. 3, Feb. 2012, 3 pages.
(Continued)

*Primary Examiner* — Cynthia H Kelly
*Assistant Examiner* — Monique M Wills
(74) *Attorney, Agent, or Firm* — Alleman Hall Creasman & Tuttle LLP

(57) ABSTRACT

Provided is a method for the preparation of a porous hollow shell $WO_3/WS_2$ nanomaterial, comprising: (1) adding a hexavalent tungsten salt to a sol A comprising mesocarbon microbeads, and stirring to obtain a sol B; (2) drying and grinding the sol B, and then heating a resulting powder at 200-500° C. for 0.5-2 hours to obtain a porous hollow shell $WO_3$ nanocrystalline material; (3) placing the porous hollow
(Continued)

shell WO$_3$ nanocrystalline material obtained by Step 2 and a sulfur powder separately in a vacuum furnace, controlling such that a degree of vacuum is −0.01 to −0.1 MPa and a temperature is 200-500° C., and reacting for 0.5-3 hours to obtain a WO$_3$/WS$_2$ porous hollow shell nanocrystalline material. Also provided is a porous hollow shell WO$_3$/WS$_2$ nanocrystalline material obtained by the method.

10 Claims, 2 Drawing Sheets

(51) Int. Cl.
*H01M 4/48* (2010.01)
*H01M 4/58* (2010.01)
*B01J 13/02* (2006.01)
*C01G 41/00* (2006.01)
*C01G 41/02* (2006.01)
*H01M 4/36* (2006.01)
*B82Y 40/00* (2011.01)
*B01J 13/00* (2006.01)
*B01J 13/04* (2006.01)
*B22F 9/24* (2006.01)
*H01M 10/054* (2010.01)

(52) U.S. Cl.
CPC ............. *H01M 4/364* (2013.01); *H01M 4/48* (2013.01); *H01M 4/483* (2013.01); *H01M 4/58* (2013.01); *H01M 4/5815* (2013.01); *B01J 13/0017* (2013.01); *B01J 13/0021* (2013.01); *B01J 13/0039* (2013.01); *B01J 13/0047* (2013.01); *B01J 13/04* (2013.01); *B22F 9/24* (2013.01); *B82Y 40/00* (2013.01); *C01P 2002/72* (2013.01); *C01P 2004/03* (2013.01); *C01P 2004/34* (2013.01); *C01P 2004/64* (2013.01); *C01P 2004/80* (2013.01); *C01P 2006/12* (2013.01); *C01P 2006/16* (2013.01); *C01P 2006/40* (2013.01); *H01M 10/054* (2013.01)

(58) Field of Classification Search
CPC .... B01J 13/0047; B01J 13/02; C01P 2004/64; C01G 41/00; C01G 41/02
See application file for complete search history.

(56) References Cited

FOREIGN PATENT DOCUMENTS

| CN | 101857274 A | 10/2010 | |
|---|---|---|---|
| CN | 103301832 A | * 9/2013 | ............... B01J 23/30 |
| CN | 103301832 A | 9/2013 | |
| CN | 103469155 A | 12/2013 | |
| CN | 103498191 A | 1/2014 | |
| CN | 103741224 A | 4/2014 | |
| CN | 104128612 A | 11/2014 | |

OTHER PUBLICATIONS

Li, Y. et al., "Novel Route to WOx Nanorods and WS2 Nanotubes from WS2 Inorganic Fullerenes," Journal of Physical Chemistry B, 110, No. 37, Aug. 26, 2006, 5 pages.

Margolin, A. et al., "Fullerene-like WS2 nanoparticles and nanotubes by the vapor-phase synthesis of WCln and H2S," Nanotechnology, vol. 19, No. 9, Feb. 12, 2008, 12 pages.

Hou, C. et al., "Synthesis and Characterization of WO3 Nano-Powder Based on Micro-Reactor in Microemulsion System," Rare Metal Materials and Engineering, vol. 36, Suppl. 3, Sep. 2007, 4 pages.

Li, J. et al., "Morphology-controlled synthesis of tungsten oxide hydrates crystallites via a facile, additive-free hydrothermal process," Ceramics International, vol. 38, Iss. 6, Feb. 17, 2012, 6 pages.

Liu, B. et al., "Hollow Mesoporous WO3 Spheres: Preparation and Photocatalytic Activity," Chinese Journal of Inorganic Chemistry, vol. 28, No. 3, Mar. 2012, 6 pages.

Su, D. et al., "WS2@graphene nanocomposites as anode materials for Na-ion batteries with enhanced electrochemical performances," Chemical Communications, Issue 32, Apr. 25, 2014, 4 pages.

Zheng Y. et al., "Preparation and Mechanism of Nesting Spherical Layered Closed-cage Structured Nano WS2," Journal of Inorganic Materials, vol. 19, No. 3, May 2004, 4 pages.

Ye A. et al., "Photochemical and electrochemical properties of tungsten trioxides and tungsten trioxide hydrates," Journal of Functional Materials, 12, No. 45, Jul. 22, 2014, 5 pages.

Prabakaran, A. et al., "WS2 2D nanosheets in 3D nanoflowers," Chemical Communications, Issue 82, Oct. 21, 2014, 3 pages.

Wang, C. et al., "Nanosheets assembled hierarchical flower-like WO3 nanostructures: Synthesis, characterization, and their gas sensing properties," Sensors and Actuators B, vol. 210, Dec. 13, 2014, 7 pages.

Li, T et al., "Urchinlike hex-WO3 microspheres: Hydrothermal synthesis and gas-sensing properties," Materials Letters, vol. 144, Jan. 15, 2015, 4 pages.

Seung, H. et al., "Sodium ion storage properties of WS2-decorated three-dimensional reduced graphene oxide microspheres," Nanoscale, Iss. 9, Mar. 5, 2015, 6 pages.

Liu, J. et al., "Few-layer WO3 nanosheets for high-performance UV-photodetectors," Materials Letters, vol. 148, Feb. 25, 2015, 4 pages.

ISA State Intellectual Property Office of the People's Republic of China, International Search Report Issued in Application No. PCT/CN2015/080765, dated Feb. 2, 2016, WIPO, 4 pages. (Submitted with English Translation of Search Report).

* cited by examiner

POROUS HOLLOW SHELL WO$_3$/WS$_2$ NANOMATERIAL AND METHOD OF PREPARING SAME

FIELD OF THE INVENTION

The present invention relates to a method for preparation of WO$_3$/WS$_2$ porous hollow shell nanomaterials, particularly to a method for preparation of WO$_3$/WS$_2$ porous hollow shell anode nanomaterials by a mesocarbon microbead (MCMB) assisted sol-low temperature vacuum thermal reduction method.

BACKGROUND OF THE INVENTION

The crystal structure of WS$_2$ is similar to that of MoS$_2$, which is a hexagonal close-packed layered structure. There is a strong chemical bond connection between the W atom and the S atom, while the interlayer S atoms are connected to each other by a weak molecular bond. The banding force between layers is a van der Waals force, and the interlayer spacing of WS$_2$ is larger than that of MoS$_2$. The thermal stability of WS$_2$ is also better. The WS$_2$ decomposes at 510° C., is oxidized fast at 539° C. in the atmosphere, and decomposes at 1150° C. in vacuum. Therefore, it can be used in a harsh application environment such as high temperature, high pressure, high vacuum, high load, radiation, and corrosive media.

As an electrode material for lithium ion batteries and sodium ion batteries, WS$_2$ has attracted extensive concerns. At present, the methods for the preparation of WS$_2$ materials mainly comprise: a thermal decomposition method [ZHU Ya-jun, ZHANG Xue-bin, JI Yi, et al. *Preparation Technology and Applications of Nanoscaled WS$_2$ and MoS$_2$* [J]. *Guangzhou Chemical Industry,* 2012, 3(40): 4-6.], a solid-gas sulfuration method [Yan-Hui Li, Yi Min Zhao, Ren Zhi Ma, Yan Qiu Zhu, Niles Fisher, Yi Zhang Jin, Xin Ping Zhang. *Novel Route to WO$_x$ Nanorods and WS$_2$ Nanotubes from WS$_2$ Inorganic Fullerenes* [J]. *J. Phys. Chem. B.* 2006, 110: 18191-18195.], an in-situ evaporation synthesis method [A Margolin, F L Deepak, R Popovitz-Biro, M Bar-Sadanl, Y Feldman, R Tenne. *Fullerene-like WS$_2$ nanoparticles and nanotubes by the vapor-phase synthesis of WCl$_n$ and H$_2$S* [J]. *Nanotechnology.* 2008, 19:95601-95611.], a spraying pyrolysis method [Seung Ho Choi, Yun Chan Kang. *Sodium ion storage properties of WS$_2$-decorated three-dimensional reduced graphene oxide microspheres* [J]. *Nanoscale.* 2015, 7: 3965-3970], a precipitation reduction method [ZHENG Yi-Fan, SONG Xu-Chun, LIU Bo, HAN Gui, XUZhu-De. *Preparation and Mechanism of Nesting Spherical Layered Closed-cage Structured Nano WS$_2$* [J].*Journal of Inorganic Materials,* 2004, 3(19): 653-656.], and a chemical vapor deposition (CVD) method [Arunvinay Prabakaran, Frank Dillon, Jodie Melbourne, et al. *WS$_2$ 2D nanosheets in 3D nanoflowers*[J]. *Chem. Commun.* 2014, 50: 12360-12362]. In addition, a WS$_2$-graphene anode composite material for a sodium ion battery has been prepared using a hydrothermal method [Dawei Su, Shixue Dou, Guoxiu Wang. *WS$_2$@graphene nanocomposites as Anode Materials for Na-Ion Batteries with Enhanced Electrochemical Performances*[J]. *Chem. Comm.,* 2014, 50: 4192-4195.], and a WS$_2$/MoS$_2$ composite has been prepared by an ultrasonic ball milling method [MAO Daheng, SHI Chen, MAO Xianghui, MAO Yan, LI Dengling. *Method for Preparing Nano WS$_2$/MoS$_2$ Granules* [P]. ZL 201010200269.6].

Meanwhile, tungsten trioxide (WO$_3$) is a significant functional material as it is the most stable oxide of tungsten at room temperature, environmentally friendly, low-cost, and of high theoretical capacity (693 mAh·g$^{-1}$), thus being a promising anode material for lithium ion batteries. However, because of the low conductivity and the large volume change during the charging and discharging process, bulk WO$_3$ has a poor rate capability and a poor cycle stability. Therefore, in order to improve the lithium storage dynamic properties of WO$_3$ materials, controlling the synthesis of WO$_3$ nanomaterials with various morphologies is considered as one improvement method. At present, the related studies reported on the WO$_3$ nanomaterials comprise: preparation of WO$_3$ nanoparticles by Microemulsion Method [Hou Changjun, Diao Xianzhen, Tang Yike, Huo Danqun, Wei Linfan. *Synthesis and Characterization of WO$_3$ Nano-Powder Based on Micro-Reactor in Microemulsion System* [J]. *RARE METAL MATERIALS AND ENGINEERING,* 2007, 36 (3): 60-63]; preparation of WO$_3$ nanocrystalline materials by a hydrothermal method [Tianming Li, Wen Zeng, Bin Miao, Shuoqing Zhao, Yanqiong Li, He Zhang. *Urchinlike hex-WO$_3$ microspheres: Hydrothermal synthesis and gas-sensing properties* [J]. *Materials Letters,* 2015, 144: 106-109]; preparation of six spline spherical WO$_3$ by a hydrothermal method [Li Jiayin, Huang Jianfeng, Wu Jianpeng, Cao Liyun, Kazumichi Yanagisawa. *Morphology-controlled synthesis of tungsten oxide hydrates crystallites via a facile, additive-free hydrothermal process*[J]. *Ceramics International,* 2012, 38: 4495-4500]; preparation of nano WO$_3$ with tungsten powder and hydrogen peroxide-peroxide polytungstic acid method [YE Ai-ling, HE Yun-qiu. *Photochemical and electrochemical properties of tungsten trioxides and tungsten trioxide hydrates* [J]. *JOURNAL OF FUNCTIONAL MATERIALS,* 2014, 12 (45): 12042-12046] and [HUANG Jianfeng, LI Jiayin, CAO Liyun, HU Baoyun, WU Jianpeng. *Preparation method of hexagon snow shaped WO$_3$ nanometer disc* [P]. ZL 200910218869.2]; preparation of hollow mesoporous WO$_3$ spheres by a spray drying-heat treatment [LIU Bai-Xiong, WANG Jin-Shu, LI Hong-Yi, WU Jun-Shu, LI Zhi-Fei. *Hollow Mesoporous WO$_3$ Spheres: Preparation and Photocatalytic Activity* [J]. *Chinese Journal of Inorganic Chemistry,* 2012, 28 (3): 465-470]; an acidification precipitation method [Chong Wang, Xin Li, Changhao Feng, Yanfeng Sun, Geyu L. *Nanosheets assembled hierarchical flower-like WO$_3$ nanostructures: Synthesis, characterization and their gas sensing properties* [J]. *Sensors and Actuators B,* 2015, 210: 75-81]; and a chemical vapor deposition method (CVD) [Jianzhe Liu, Mianzeng Zhong, Jingbo Li, Anlian Pan, Xiaoli Zhu. *Few-layer WO$_3$ nanosheets for high-performance UV-photodetectors* [J]. *Materials Letters,* 2015, 148: 184-187].

In these methods, the powders were synthesized at a high temperature in an inert atmosphere by a precipitation reduction method, a thermal decomposition method, and a sulfidation method, which are prone to agglomeration, the process conditions are difficult to control, and the utilization rate of original materials required for the preparation is much lower. In addition, according to the solid state reaction, sintering or sulfidation reaction in a reduction atmosphere can also lead to agglomeration of nanocrystals and abnormal growth of grains, thus it is difficult to tailor and control the microstructure of the materials. The in-situ evaporation method and chemical vapor deposition method have high requirements for equipment and the corresponding ratio of reactants is difficult to control. In addition, impurities are prone to be introduced into the prepared nanomaterial, and the powders are prone to agglomeration. However, there are few reports on research about WS$_2$ and WO$_3$ composite materials, their application as an anode material for a sodium ion battery, and a hard template assisted sol-low temperature vacuum thermal reduction technology for preparation of a $WO_3/WS_2$ porous hollow shell nanomaterial by combining a mesocarbon microbead (MCMB) assisted sol technology and a low temperature thermal reduction method.

Technical Problem

The aim of the present invention is to overcome the technical problems for the preparation of a $WO_3/WS_2$ porous hollow shell nanomaterial, and the present invention provides a method for the preparation of a $WO_3/WS_2$ porous hollow shell nanomaterial, and a $WO_3/WS_2$ porous hollow shell nanomaterial with excellent performance obtained by the method.

SOLUTION TO THE PROBLEM

Technology Solution

The present invention provides a method for the preparation of a $WO_3/WS_2$ porous hollow shell nanomaterial, comprising the steps of:

1) adding a hexavalent tungsten salt to a sol A comprising mesocarbon microbeads, and stirring to obtain a sol B, wherein a concentration of the mesocarbon microbeads in the sol A is 0.002~0.2 g/mL, and a concentration of the $W^{6+}$ in the sol B is 0.01~2.0 mol/L;

2) drying and grinding the sol B obtained by Step 1, and then heating a resulting powder at 200-500° C. for 0.5-2 hours to obtain a porous hollow shell $WO_3$ nanocrystalline material; and 3) placing the porous hollow shell $WO_3$ nanocrystalline material obtained by Step 2 and a sulfur powder separately into a vacuum tube furnace, controlling such that a degree of vacuum is −0.01 to −0.1 MPa and a temperature is 200-500° C., and reacting for 0.5-3 hours to sulfurize some $WO_3$ of the porous hollow shell $WO_3$ nanocrystalline material into $WS_2$ to obtain a $WO_3/WS_2$ porous hollow shell nanocrystalline material.

In the method of the present invention, a porous hollow shell $WO_3$ nanocrystalline material is first prepared by a mesocarbon microbead (MCMB) assisted sol-gel and then the porous hollow shell $WO_3$ nanocrystalline material is partially sulfurized. According to the method, the sulfuration reaction for formation of tungsten sulfide is facilitated (reacting at a low temperature (200-500° C.), requiring a small amount of sulfur), and a $WO_3/WS_2$ porous hollow shell nanocrystalline material is obtained, which has good crystallinity, a homogeneous morphology, and a good charge-discharge cycling stability, being suitable for serving as battery electrode materials.

Preferably, the solvent of the sol A is anhydrous ethanol, isopropyl alcohol, ethylene glycol, and/or distilled water, the sol A further comprises a dispersant, the dispersant being polyvinyl alcohol, carboxymethylcellulose sodium, lauryl sodium sulfate, and/or polyethylene glycol, and the concentration of the dispersant in the sol A is 0.006~0.25 g/mL.

The sol A is obtained by adding a dispersant to a solvent and stirring to dissolve, followed by adding the mesocarbon microbeads thereto and stirring to disperse, and then placing a resulting mixture in a 300~1000 W ultrasonic generator for ultrasonic vibration for 20~60 minutes.

The sol B is obtained by adding a hexavalent tungsten salt to the sol A and stirring, then placing a resulting mixture in a 300~1000 W ultrasonic generator for ultrasonic vibration and aging for 60~180 minutes.

Preferably, in Step 2, the sol B is dried in a vacuum drying oven at 40-70° C. for 2-6 hours, followed by being ground.

Preferably, a mass ratio of the porous hollow shell $WO_3$ nanocrystalline material to the sulfur powder is (0.1~10 g):(0.1~4.0 g). $WO_3/WS_2$ porous hollow shell nanomaterials with different sulfur contents can be prepared by controlling the mass ratio of $WO_3$ nanocrystalline material to sulfur powder.

In the present invention, the hexavalent tungsten salt may be at least one of tungsten hexachloride, sodium tungstate, ammonium tungstate, and sodium polytungstate.

The present invention further provides a $WO_3/WS_2$ porous hollow shell nanomaterial obtained by the method above, in which the porous hollow shell presents a honeycomb structure with a pore size of 0.2~2.0 μm and a shell wall thickness of 40-150 nm, and nanoparticles attached thereon have a particle size of 30-100 nm.

Preferably, a mass ratio of $WO_3$ to $WS_2$ in the $WO_3/WS_2$ porous hollow shell nanomaterial is 1:9-9:1.

Preferably, a specific surface area of the $WO_3/WS_2$ porous hollow shell nanomaterial is 300-700 m²/g.

THE BENEFICIAL EFFECT OF THE INVENTION

Beneficial Effect

The beneficial effect of the present invention: the present invention provides a $WO_3/WS_2$ porous hollow shell anode material for a sodium ion battery. The composite electrode material is prepared by a method combining MCMB assisted sol technique and low temperature thermal reduction, and the process can employ a simple equipment. An effective structural regulation of the material can be achieved, and helps to improve the specific surface area of the material with the assistance of the MCMB template, so as to avoid the formation of defects such as structure changes of the composite material during the heat-treatment process and introduction of impurities because of reaction atmosphere etc. Meanwhile, the agglomeration degree is small, and an appropriate stoichiometric and single morphology $WO_3/WS_2$ porous hollow shell composite material with uniform gains can be obtained using cheap original materials. More importantly, the low temperature heat-treatment and vacuum thermal reduction can make the composite material finely crystalized quickly and efficiently, and the thermal oxidation of MCMB can make the composite material porous and have uniformly distributed particles with a small diameter. The sulfuration degree can be controlled by adjusting the addition of the sulfur powder through the vacuum thermal reduction method, which is clean, harmless, and more beneficial for obtaining $WO_3/WS_2$ composites with different ratios of $WO_3$ to $WS_2$. In addition, the sol assisted technology could further reduce the synthetic activation energy of the material, so that the heat-treatment temperature of the system could be accordingly reduced. Therefore, the method herein is more efficient, economical, and feasible, and the $WO_3/WS_2$ porous hollow shell composite material prepared by the method has superior electrochemical properties.

BRIEF DESCRIPTION OF THE DRAWINGS

Drawings Description

DETAILED DESCRIPTION OF THE EMBODIMENTS

Figure 1:
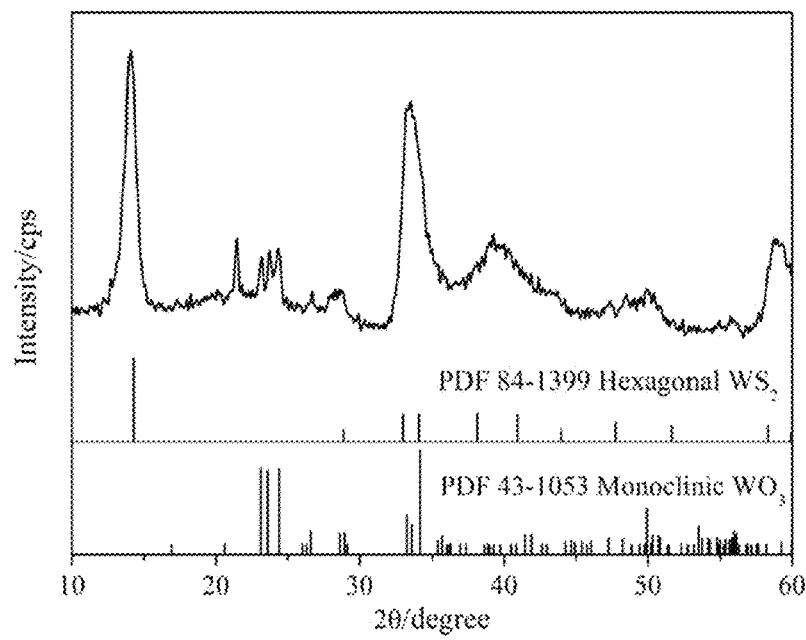
FIG. 1 shows an XRD pattern of the $WO_3/WS_2$ composite material obtained by an example of the present invention.

The present invention will be further described with the following embodiments with reference to the drawings. It should be understood that the drawings and the following embodiments are only used for explaining this invention, and do not limit this invention.

The present invention relates to a method for preparation of a $WO_3/WS_2$ porous core-shell nanomaterial, particularly to a method for preparation of $WO_3/WS_2$ porous hollow shell nano anode materials by a mesocarbon microbead (MCMB) assisted sol-low temperature vacuum thermal reduction method.

The purpose of this invention is to provide a facile, environmentally friendly, efficient, and controllable method, through which a high purity product can be obtained, and the morphology and composition of the product can be controlled by controlling the formulation of the sol, the proportion of the MCMB and the thermal reduction agent, etc., and which is more efficient, rapid, economical, and environmentally friendly than the high temperature solid state reaction and the thermal decomposition method, and safer and more reliable, being able to realize the structural control at atmospheric pressure and low temperature as compared with the hydrothermal method and the solvothermal method. Moreover, the $WO_3/WS_2$ porous core-shell anode nanomaterial prepared by the method of the MCMB assisted sol-low temperature thermal reduction method herein has good crystallinity, a uniform morphology, and long cycle stability.

In order to achieve this purpose, the present invention may employ the following technical solutions:

Step 1: 0.5-5 g of a dispersant (for example, polyvinyl alcohol (PVA, analytic reagent), carboxymethylcellulose sodium (CMC, analytic reagent), analytically pure sodium dodecyl sulfate, and analytically pure polyethylene glycol (PEG-4000), etc.) is added to 20-80 ml of a solvent (for example, anhydrous ethanol, isopropyl alcohol, ethylene glycol, distilled water, etc.), and fully dissolved therein by stirring constantly, then 0.2-4.0 g of mesocarbon microbeads (commercially available, with a ball diameter of 2-5 MCMB) are added thereto and fully dispersed therein by stirring constantly. The resulting mixture is subjected to ultrasonic vibration in an ultrasonic generator of 300~1000 W for 20~60 minutes to give a sol denoted as A.

Step 2: an analytically pure hexavalent tungsten salt (for example, tungsten hexachloride ($WCl_6$)) is added to a sol A in such a manner that the concentration of $W^{6+}$ is 0.01~2.0 mol/L, and fully dissolved therein by stirring constantly, then the resulting mixture is subjected to ultrasonic vibration and aging in an ultrasonic generator of 300~1000 W for 60~180 minutes, to give a sol denoted as B.

Step 3: the sol B is dried in a vacuum drying oven of 40-70° C. for 2-6 hours, and subjected to grinding, then placed into a box type furnace, kept therein at a temperature of 200~500° C. for 0.5~2 hours, and naturally cooled to room temperature, to give a $WO_3$ porous hollow shell nanocrystalline material. The porous hollow shell $WO_3$ nanocrystalline precursor presents a honeycomb structure, the pore size being 0.2~1.5 um, the thickness of the shell wall being 30-120 nm, and the particle size of the nanoparticles attached thereon being 30-100 nm. The specific surface area of the porous hollow shell $WO_3$ nanocrystalline material is 400~800 m$^2$·g$^{-1}$;

Step 4: the $WO_3$ nanocrystalline material and a sulfur powder with a ratio of m($WO_3$):m(sulfur powder)=(0.1-10 g):(0.1-4.0 g) are placed separately in a vacuum tube furnace, and kept in the furnace with a vacuum degree of −0.01 to −0.1 MPa at a temperature of 200-500° C. for 0.5-3 hours, followed by natural cooling to room temperature, then the reaction product is removed to obtain a $WO_3/WS_2$ porous hollow shell nanocrystalline material, in which the mass ratio of $WO_3$ to $WS_2$ ($m_{wo3}:m_{ws2}$) is 1:9-9:1. The as-prepared $WO_3/WS_2$ porous hollow shell nanomaterial keeps the porous hollow shell structure of the $WO_3$ nanocrystalline precursor, namely, the porous hollow shell presents a honeycomb structure, and the pore size thereof is 0.2~2.0 μm, the thickness of the shell wall is 40-150 nm, the particle size of the nanoparticles attached thereon is 30-100 nm, and the specific surface area of the $WO_3/WS_2$ porous hollow shell nanomaterial is 300~700 m$^2$·g$^{-1}$.

A RCT B S25 magnetic stirrer produced by Mettler Toledo instruments (Shanghai) Co., Ltd. is used for stirring in Step 1.

The ultrasonic generator in Step 1 is a high power digital ultrasonic generator (Kunshan Ultrasonic Instrument Co., Ltd. Model: KQ-1000KDB).

The electrothermal vacuum drying oven in Step 3 is a DZ-3BCII type vacuum drying oven produced by Tianjin Taisite Instrument Co., Ltd.

The box type electric furnace used in Step 3 is KSL-1500X produced by Hefei Ke Jing Materials Technology Co., Ltd.

The vacuum tube furnace used in Step 4 is OTF-1200X produced by Hefei Ke Jing Materials Technology Co., Ltd.

The present invention provides a $WO_3/WS_2$ porous hollow shell material for a sodium ion battery anode. The composite electrode material is prepared by a method combining MCMB assisted sol technique and low temperature thermal reduction, and the process can employ simple equipment. An effective two-step structural regulation of the material can be achieved, which helps to improve the specific surface area of the material with the assistance of the MCMB template, so as to avoid the formation of defects such as structure changes of the composite material during the heat-treatment process and introduction of impurities because of reaction atmosphere, etc. Meanwhile, the agglomeration degree is small, and an appropriate stoichiometric and single morphology $WO_3/WS_2$ porous hollow shell composite material with uniform gains can be obtained using low-cost original materials. More importantly, the low temperature heat-treatment and vacuum thermal reduction can make the composite material finely crystalized quickly and efficiently, and the thermal oxidation of MCMB can make the composite material porous and have uniformly distributed particles with a small diameter. The sulfuration degree can be controlled by adjusting the addition of the sulfur powder through the vacuum thermal reduction method, which is clean, harmless, and more beneficial for obtaining $WO_3/WS_2$ composites with different ratios of $WO_3$ to $WS_2$. In addition, the sol assisted technology could further reduce the synthetic activation energy of the material, so that the heat-treatment temperature of the system could be accordingly reduced. Therefore, the method herein is more efficient, economical, and feasible, and the $WO_3/WS_2$ porous hollow shell composite material prepared by the method has superior electrochemical properties.

As can be seen from FIG. 1, the $WO_3/WS_2$ composite anode material prepared by the present invention has two crystalline phases, $WS_2$ and $WO_3$, respectively, and the diffraction peaks are intensive, and consistent with the standard card PDF 84-1399 Hexagonal $WS_2$ and PDF 43-1053 Monoclinic $WO_3$ coincide, respectively.

Figure 2:
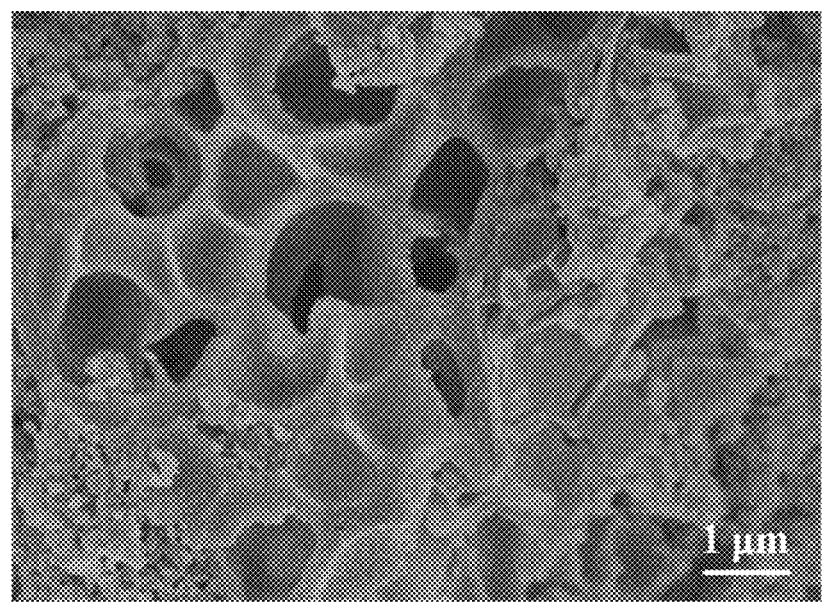
FIG. 2 shows a SEM image of the $WO_3/WS_2$ composite material obtained by the example of the present invention.

As can be seen from FIG. 2, the $WO_3/WS_2$ composite material prepared by the present invention has a uniform structure and uniformly distributed sizes, presenting a hollow shell honeycomb structure with a pore diameter of 0.8 μm, and a shell wall thickness of 85 nm, while the particle size of the nanoparticles attached thereon is 40 nm.

Figure 3:
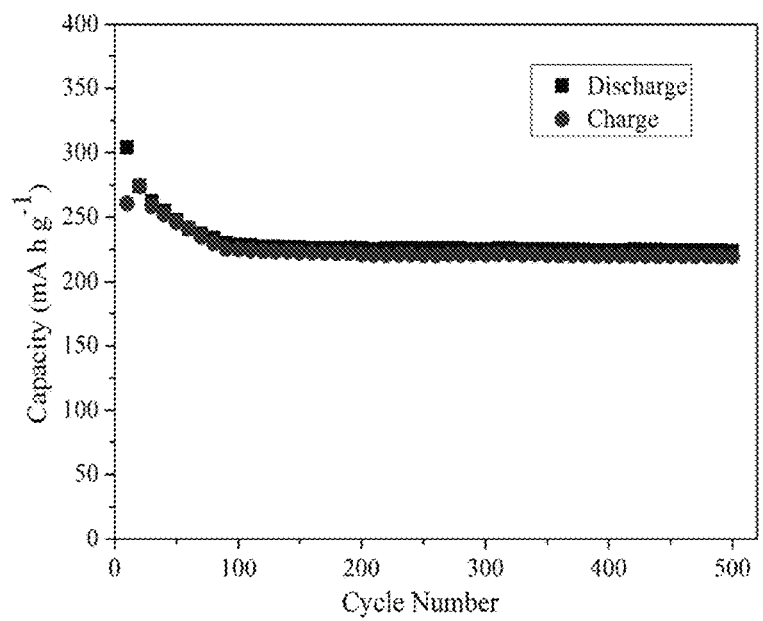
FIG. 3 shows a cycle performance curve of the $WO_3/WS_2$ composite anode material obtained by the example of the present invention (Current density: 100 mA·g$^{-1}$; Voltage: 0~3 V).

FIG. 3 shows a cycle performance curve of the $WO_3/WS_2$ sodium-ion battery composite anode material prepared according to the present invention (current density: 100 $mAg^{-1}$; voltage: 0~3 V). As can be seen in FIG. 3, the material as prepared still retains a capacity of 223 $mAh \cdot g^{-1}$ after 500 cycles, showing that the material has a superior retention rate of cycle performance and capacity.

Hereinafter, the present invention will be described in detail with the following representative examples. It is understood that the following examples are only used to explain this invention and do not limit the scope of this invention, and any non-essential improvements and modifications made by a person skilled in the art based on this invention all fall into the protection scope of this invention. The specific parameters below are only exemplary, and a person skilled in the art can choose proper values within an appropriate range according to the description of this article, and are not restricted to the specific values cited below.

EXAMPLE 1

Step 1: 1.0 g of polyvinyl alcohol (PVA, analytic reagent) was added to 30 ml of anhydrous ethanol, and fully dissolved therein by stirring constantly, then 0.8 g of mesocarbon microbeads (commercially available, with a ball diameter of 2~5 μm, MCMB) were added thereto and fully dispersed therein with stirring constantly. The resulting mixture was subjected to ultrasonic vibration in an ultrasonic generator of 300 W for 30 minutes to give a sol denoted as A.

Step 2: a tungsten hexachloride ($WCl_6$, analytic reagent) was added to the sol A in such a manner that the concentration of $W^{6+}$ is 0.08 mol/L, and fully dissolved therein by stirring constantly, then the resulting mixture was subjected to ultrasonic vibration and aged in an ultrasonic generator of 300 W for 60 minutes to give a sol B.

Step 3: the sol B was dried in a vacuum drying oven of 50° C. for 5 hours, and subjected to grinding, then placed into a box type furnace, kept therein at a temperature of 260° C. for 2 hours, and naturally cooled to room temperature, to give a porous hollow shell $WO_3$ nanocrystalline material. The $WO_3$ nanocrystalline precursor has a specific surface area of 500 $m^2 \cdot g^{-1}$, a pore size of 0.6 μm, and a shell wall thickness of 60 nm.

Step 4: the porous hollow shell $WO_3$ nanocrystalline material and a sulfur powder, with a ratio of $m(WO_3)$:m (sulfur powder)=0.15 g:0.3 g, were placed separately in a vacuum tube furnace, and kept in the furnace with a vacuum degree of −0.05 Mpa at a temperature of 300° C. for 2.5 hours, followed by natural cooling to room temperature, then the reaction product was taken out to obtain a $WO_3$/ $WS_2$ porous hollow shell nanocrystalline material, in which the mass ratio of $WO_3$ to $WS_2$ ($m_{wo3}$:$m_{ws2}$) is 1:9.

In the $WO_3/WS_2$ porous hollow shell honeycomb nanomaterial, the pore size is 0.8 μm, and the thickness of the shell wall is 85 nm, and the particle size of the nanoparticles attached thereon is 40 nm.

The specific surface area of the $WO_3/WS_2$ porous hollow shell nanomaterial is 450 $m^2 g^{-1}$.

EXAMPLE 2

Step 1: 2.0 g of polyvinyl alcohol (PVA, analytic reagent) was added to 40 ml of anhydrous ethanol, and fully dissolved therein by stirring constantly, then 0.4 g of mesocarbon microbeads (commercially available, with a ball diameter of 2~5 μm, MCMB) were added thereto and fully dispersed therein by stirring constantly. The resulting mixture was subjected to ultrasonic vibration in an ultrasonic generator of 400 W for 40 minutes to give a sol denoted as A.

Step 2: a tungsten hexachloride ($WCl_6$, analytic reagent) was added to the sol A in such a manner that the concentration of $W^{6+}$ is 0.1 mol/L, and fully dissolved therein by stirring constantly, then the resulting mixture was subjected to ultrasonic vibration and aged in an ultrasonic generator of 400 W for 80 minutes to give a sol B.

Step 3: the sol B was dried in a vacuum drying oven of 55° C. for 4 hours, and subjected to grinding, then placed into a box type furnace, kept therein at a temperature of 300° C. for 1.5 hours, and naturally cooled to room temperature, to give a porous hollow shell $WO_3$ nanocrystalline material. The $WO_3$ nanocrystalline precursor has a specific surface area of 400 $m^2 \cdot g^{-1}$, a shell wall thickness of 85 nm, and a pore size of 0.8 μm.

Step 4: the porous hollow shell $WO_3$ nanocrystalline material and a sulfur powder, with a ratio of $m(WO_3)$:m (sulfur powder)=2.0 g:2.0 g, were placed separately in a vacuum tube furnace, and kept in the furnace with a vacuum degree of −0.02 Mpa at a temperature of 350° C. for 2 hours, followed by natural cooling to room temperature, then the reaction product was taken out to obtain a $WO_3/WS_2$ porous hollow shell nanocrystalline material, in which the mass ratio of $WO_3$ to $WS_2$ ($m_{wo3}$:$m_{ws2}$) is 1:4.

The $WO_3/WS_2$ porous hollow shell honeycomb nanomaterial has a specific surface area of 360 $m^2 \cdot g^{-1}$, a shell wall thickness of 100 nm, and a pore size of 1.0 μm, and the particle size of the nanoparticles attached thereon is 50 nm.

EXAMPLE 3

Step 1: 3.0 g of polyvinyl alcohol (PVA, analytic reagent) was added to 70 ml of anhydrous ethanol, and fully dissolved therein by stirring constantly, then 2.0 g of mesocarbon microbeads (commercially available, with a ball diameter of 5~9 μm, MCMB) were added thereto and fully dispersed therein by stirring constantly. The resulting mixture was subjected to ultrasonic vibration in an ultrasonic generator of 600 W for 30 minutes to give a sol denoted as A.

Step 2: a tungsten hexachloride ($WCl_6$, analytic reagent) was added to the sol A in such a manner that the concentration of $W^{6+}$ is 0.4 mol/L, and fully dissolved therein by stirring constantly, then the resulting mixture was subjected to ultrasonic vibration and aged in an ultrasonic generator of 600 W for 120 minutes to give a sol B.

Step 3: the sol B was dried in a vacuum drying oven of 60° C. for 3 hours, and subjected to grinding, then placed into a box type furnace, kept therein at a temperature of 350° C. for 1 hour, and naturally cooled to room temperature, to give a porous hollow shell WO$_3$ nanocrystalline material. The WO$_3$ nanocrystalline precursor has a specific surface area of 600 m$^2$·g$^{-1}$, a shell wall thickness of 60 nm, and a pore size of 0.4 μm.

Step 4: the porous hollow shell WO$_3$ nanocrystalline material and a sulfur powder, with a ratio of m(WO$_3$):m(sulfur powder)=7.0 g:3.0 g, were placed separately in a vacuum tube furnace, and kept in the furnace with a vacuum degree of −0.1 Mpa at a temperature of 400° C. for 1.5 hours, followed by natural cooling to room temperature, then the reaction product was removed to obtain a WO$_3$/WS$_2$ porous hollow shell nanocrystalline material, in which the mass ratio of WO$_3$ to WS$_2$ (m$_{wo3}$:m$_{ws2}$) is 3:7.

The WO$_3$/WS$_2$ porous hollow shell honeycomb nanomaterial has a specific surface area of 550 m$^2$/g, a shell wall thickness of 70 nm, and a pore size of 0.6 μm, and the particle size of the nanoparticles attached thereon is 50 nm.

EXAMPLE 4

Step 1: 5.0 g of polyvinyl alcohol (PVA, analytic reagent) was added to 80 ml of anhydrous ethanol, and fully dissolved therein by stirring constantly, then 4.0 g of mesocarbon microbeads (commercially available, with a ball diameter of 2~5 μm, MCMB) were added thereto and fully dispersed therein by stirring constantly. The resulting mixture was subjected to ultrasonic vibration in an ultrasonic generator of 800 W for 20 minutes to give a sol denoted as A.

Step 2: a tungsten hexachloride (WCl$_6$, analytic reagent) was added to the sol A in such a manner that the concentration of W$^{6+}$ is 2.0 mol/L, and fully dissolved therein by stirring constantly, then the resulting mixture was subjected to ultrasonic vibration and aged in an ultrasonic generator of 800 W for 60 minutes to give a sol B.

Step 3: the sol B was dried in a vacuum drying oven of 70° C. for 2 hours, and subjected to grinding, then placed into a box type furnace, kept therein at a temperature of 400° C. for 0.5 hours, and naturally cooled to room temperature, to give a porous hollow shell WO$_3$ nanocrystalline material. The WO$_3$ nanocrystalline precursor has a specific surface area of 800 m$^2$·g$^{-1}$, a shell wall thickness of 40 nm, and a pore size of 0.2 μm.

Step 4: the porous hollow shell WO$_3$ nanocrystalline material and a sulfur powder, with a ratio of m(WO$_3$):m(sulfur powder)=9.0 g:4.0 g, were placed separately in a vacuum tube furnace, and kept in the furnace with a vacuum degree of −0.06 Mpa at a temperature of 450° C. for 1 hour, followed by natural cooling to room temperature, then the reaction product was taken out to obtain a WO$_3$/WS$_2$ porous hollow shell nanocrystalline material, in which the mass ratio of WO$_3$ to WS$_2$ (m$_{wo3}$:m$_{ws2}$) is 2:3.

The WO$_3$/WS$_2$ porous hollow shell honeycomb nanomaterial has a specific surface area of 700 m$^2$/g, a shell wall thickness of 50 nm, and a pore size of 0.4 μm, and the particle size of the nanoparticles attached thereon is 30 nm.

The invention claimed is:

1. A method for preparing a WO$_3$/WS$_2$ porous hollow shell nanocrystalline anode material, comprising the steps of:
   1) adding a hexavalent tungsten salt to a sol A comprising mesocarbon microbeads, and stirring to obtain a sol B, wherein a concentration of the mesocarbon microbeads in the sol A is 0.002~0.2 g/mL, and a concentration of the W6+in the sol B is 0.01~2.0 mol/L;
   2) drying and grinding the sol B obtained by Step 1, and then heating a resulting powder at 200-500° C. for 0.5-2 hours to obtain a porous hollow shell WO$_3$ nanocrystalline material; and
   3) placing the porous hollow shell WO$_3$ nanocrystalline material obtained by Step 2 and a sulfur powder separately into a vacuum tube furnace, controlling such that a degree of vacuum is −0.01 to −0.1 MPa and a temperature is 200-500° C., and reacting for 0.5-3 hours to sulfurize some WO$_3$ of the porous hollow shell WO$_3$ nanocrystalline material into WS$_2$ to obtain a WO$_3$/WS$_2$ porous hollow shell nanocrystalline anode material.

2. The method according to claim 1, characterized in that a solvent of the sol A is at least one of anhydrous ethanol, isopropyl alcohol, ethylene glycol, and distilled water, the sol A further comprises a dispersant, the dispersant being at least one of polyvinyl alcohol, carboxymethylcellulose sodium, lauryl sodium sulfate, and polyethylene glycol, and a concentration of the dispersant in the sol A is 0.006~0.25 g/mL.

3. The method according to claim 2, characterized in that the sol A is obtained by adding a dispersant to the solvent and stirring to dissolve, followed by adding the mesocarbon microbeads thereto and stirring to disperse, and then placing a resulting mixture in a 300~1000 W ultrasonic generator for ultrasonic vibration for 20~60 minutes.

4. The method according to claim 1, characterized in that the sol B is obtained by adding the hexavalent tungsten salt to the sol A and stirring, then placing a resulting mixture in a 300~1000 W ultrasonic generator for ultrasonic vibration and aging for 60~180 minutes.

5. The method according to claim 1, characterized in that, in Step 2, the sol B is dried in a vacuum drying oven at 40-70° C. for 2-6 hours, followed by being ground.

6. The method according to claim 1, characterized in that a mass ratio of the porous hollow shell WO$_3$ nanocrystalline material to the sulfur powder is 0.1-10 g porous hollow shell WO$_3$ nanocrystalline material to 0.1-4.0 g sulfur powder.

7. The method according to claim 1, characterized in that the hexavalent tungsten salt is at least one of tungsten hexachloride, sodium tungstate, ammonium tungstate, and sodium polytungstate.

8. A WO$_3$/WS$_2$ porous hollow shell nanocrystalline anode material obtained by the method according to claim 1, in which a porous hollow shell presents a honeycomb structure with a pore size of 0.2~2.0 μm and a shell wall thickness of 40-150 nm, and nanoparticles attached thereon have a particle size of 30-100 nm.

9. The WO$_3$/WS$_2$ porous hollow shell nanocrystalline anode material according to claim 8, characterized in that a mass ratio of WO$_3$ to WS$_2$ in the WO$_3$/WS$_2$ porous hollow shell nanocrystalline anode material is at least 1 part WO$_3$ to 9 parts WS$_2$ and at most 9 parts WO$_3$ to 1 part WS$_2$.

10. The WO$_3$/WS$_2$ porous hollow shell nanocrystalline anode material according to claim 8, characterized in that a specific surface area of the WO$_3$/WS$_2$ porous hollow shell nanocrystalline anode material is 300-700 m$^2$/g.

* * * * *